United States Patent [19]

De Vries

[11] Patent Number: 4,504,150

[45] Date of Patent: Mar. 12, 1985

[54] EXTRUDER

[75] Inventor: Gerhard De Vries, Garbsen, Fed. Rep. of Germany

[73] Assignee: Continental Gummi-Werke Aktiengesellschaft, Hanover, Fed. Rep. of Germany

[21] Appl. No.: 511,320

[22] Filed: Jul. 6, 1983

[30] Foreign Application Priority Data

Jul. 8, 1982 [DE] Fed. Rep. of Germany ....... 3225512

[51] Int. Cl.$^3$ .............................................. B29B 1/06
[52] U.S. Cl. ...................................... 366/80; 366/601
[58] Field of Search .................... 366/149, 183, 79, 80, 366/83, 88, 90, 81, 75, 76, 96–99, 302, 307, 318, 324, 132; 425/207–209, 154; 241/36; 100/48, 53, 117

[56] References Cited

U.S. PATENT DOCUMENTS 4,178,104 12/1979 Menges et al. .................. 366/90 X Primary Examiner—Timothy F. Simone
Attorney, Agent, or Firm—Becker & Becker, Inc.

[57] ABSTRACT

An extruder which serves for kneading and extruding rubber and synthetic material mixtures. The extruder is equipped with a rotatably mounted screw, and pin bodies which project into the interior of the housing. These pin bodies can be damaged, and in particular can be bent or even broken. In order to quickly determine these failures, and possibly to even determine deformed pin bodies, the latter are incorporated into an electrical monitoring circuit. The pin bodies are provided with electrical inserts which influence the monitoring circuit when deformations or breakage of the pin bodies occur, in order in this way to transmit a signal or even electrically switch off the extruder. In place of the electrical inserts, photo conductors can be used, the optical conductivity of which can be utilized for determining the aforementioned damages.

10 Claims, 2 Drawing Figures

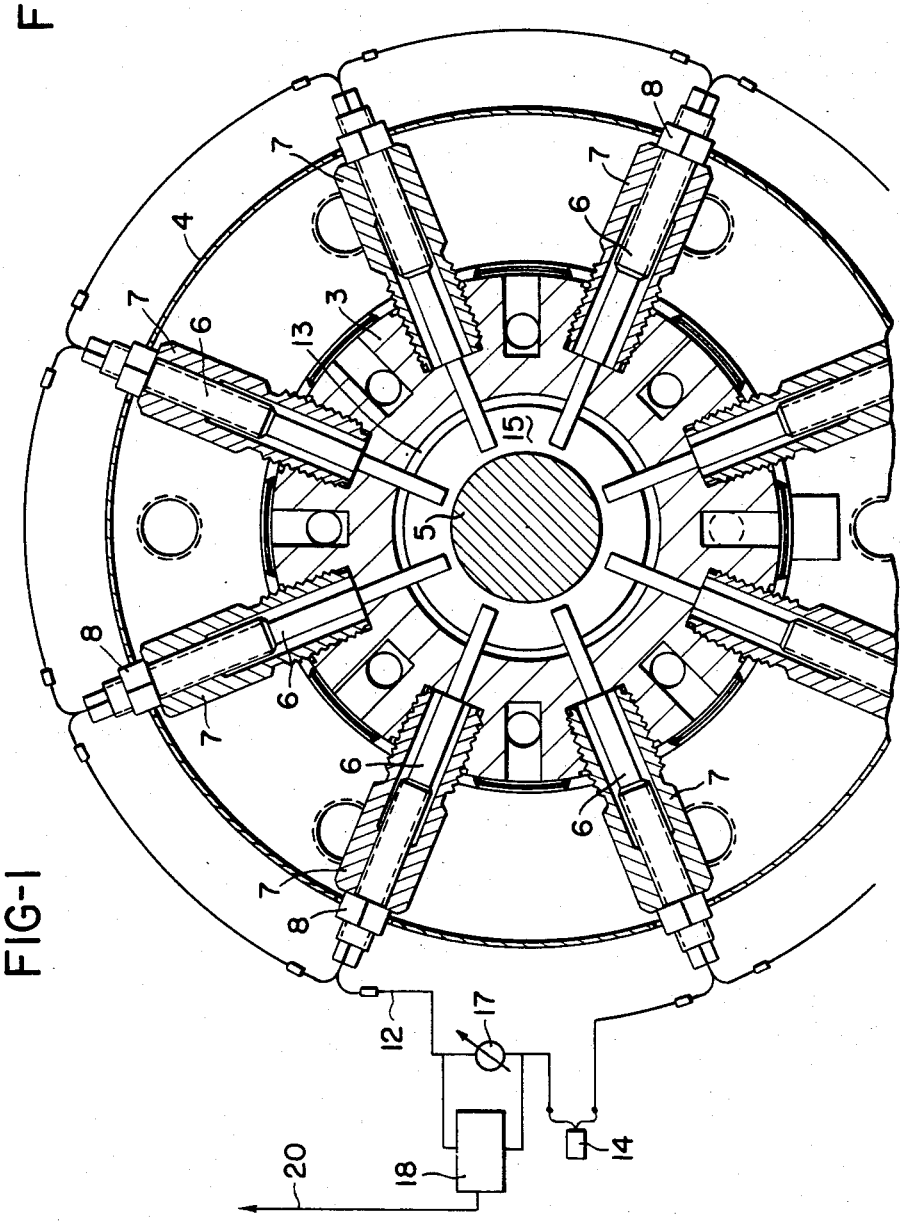

EXTRUDER

The present invention relates to an extruder for kneading and extruding rubber and synthetic material mixtures, and this extruder has a screw, which is rotatably mounted in a cylindrical housing, and pin bodies which are inserted into the wall of the housing and project freely into the interior of the housing between the recesses of the screw.

BACKGROUND OF THE INVENTION

1. Field of the Invention

The pin bodies, which serve to split up and rearrange or fold over the mass flow as a result of considerable turbulences in the otherwise predominantly laminar flow directly within the worm-lands or threads of the screw, and hence serve for intensive mixing of the extrusion material, are generally disposed in a plurality of radial planes which are respectively distributed in a star-shaped orientation over the length of the extruder housing. Extruders which are provided with such screw housings, generally known as "pin cylinders" or also "cross-current mixing cylinders", have proven themselves in operation, and have completely fulfilled expectations associated with the generation of profiled strands having improved homogeneity. However, failure or breakage of individual pins surprisingly occurred over and over again during operation; these failures generally also resulted in further secondary or consequential damages. Since at the beginning of the kneading or mixing process, the extrusion mass is still relatively viscous and does not flow readily, primarily those pin bodies which are located in the entry region of the extruder are struck, so that under the effect of the pressure of the plastic mass flow, which is particularly great in this region, particularly those pins located here are subject to failure or breakage. During further transport to the nozzle or orifice of the extruder, the loose metallic pieces of the broken pins are carried along and cause even worse damage to the subsequently arranged pin bodies as well as to the screw, the housing walls, and the nozzle of the extruder. These damaging effects can even be observed outside the extruder on other subsequently arranged equipment, such as calender rolls. Since the pin bodies project with only slight lateral free space into the recesses expressly provided therefor in the lands or threads of the screw, even slight deformations which are short of a break are already enough to bring them into direct contact with the threads of the screw, resulting in either their complete breaking off or at least to deformation or a breaking off of the threads of the screw. In all cases, lengthy and expensive repair work is unavoidable. All attempts to prevent the danger of breakage by means of a special shape of the pin bodies, have proven up to now to be unsuccessful.

SUMMARY OF THE INVENTION

It is therefore an object of the present invention to determine the breakage and also even each excessive deformation of the pin bodies already in the initial stage, and to either indicate this early by means of an externally given signal, or to utilize this for turning off the drive motor.

The extruder of the present invention is characterized primarily in that at least those pin bodies associated with the entry region of the extruder are provided with inserts which are incorporated into an external electrical monitoring circuit, are insulated relative to the pin bodies, and comprise a material of which the electrical resistance changes as a result of deformations. Alternatively, instead of electrical conductors, and with essentially the same effect, photo conductive filaments can be provided which are also incorporated into an external monitoring system, and the optical conductivity of which changes as a result of deformations. The inserts are expediently guided from the outer ends of the pin bodies, i.e. those ends remote from the housing, to the inner end portions which project into the interior of the housing. Each of the inserts may be accommodated in a central blind hole which is accommodated in a pin body and is open toward the outer end thereof. With a view toward the desired direct connectability to the monitoring circuit, it is advisable that the inserts, pursuant to a specific further feature of the present invention, contain an electrical or optical conductor which passes through in the form of a two-wire loop. Light conductive filaments offer no great selection with regard to their material as relates to the basic requirement for optical transmission. However, in the case of an electrically conductive element, it is advantageous if, pursuant to an important further feature of the present invention, the inserts contain a conductor which is made of a material which is considerably more brittle than metal, such as graphite or compound materials of particles; the conductor may be embedded in a glass, ceramic, or other electrically insulating synthetic material mass.

The present invention makes it possible reliably to recognize the occurrence of failure or breakage of pins at the time that they originate and to take preventive measures promptly prior to the occurence of severe secondary or consequential damages, or to already switch off the extruder drive as a result of pronounced deformations of the pins so as to prevent the breakage of the damaged pins altogether. Even if the strength of the pins themselves is not affected, the present invention does, however, produce the conditions for avoiding, according to all experience, the essentially more extensively feared secondary or consequential damages, and to limit the extent of necessary repairs to the mere replacement of the damaged pin body.

The electrical or optical pulse triggered in the event of damage can be converted with known means into an audible and/or visible warning signal, or can be utilized directly to shut off the drive of the extruder. The present invention is not restricted to any particular transmission means, circuit element, and control means, and is similarly not limited to a preferred monitoring system. Rather, it is within the scope of the present invention selectively to make use of electrical, photo electrical, inductive, capacitive, or possibly some other transmission means, depending upon the suitability and the existing conditions. Under certain circumstances, it may also be possible to use compressible or non-compressible pressure media.

BRIEF DESCRIPTION OF THE DRAWING

This object, and other objects and advantages of the present invention, will appear more clearly from the following specification in conjunction with the accompanying drawing, in which:

FIG. 1 is a schematic cross section through the pin cylinder of an extruder in the plane of division of one peripheral row of pin bodies; and FIG. 2 in a larger scale shows a longitudinal section through one inventive embodiment of an individual pin body.

DESCRIPTION OF PREFERRED EMBODIMENTS

Referring now to the drawing in detail, the illustrated extruder contains in a cylindrical housing 3, which is provided with a cooling jacket 4, a rotatably mounted and drivable screw 5, the thread-like recesses 15 of which, together with the surrounding housing wall, act simultaneously in a homogenizing and conveying manner on the processed plastic mixture. The cooling jacket 4 is supported relative to the housing 3 by means of ribs (not shown), and with the housing forms an annular chamber which, if desired, can be divided up several times. A cooling fluid is circulated in the annular chamber with the aid of similarly non-illustrated means.

Pins 6, which are disposed in a plurality of spaced apart and successively arranged planes, project into the working space 13 of the housing 3, through which working space the mixture flows. The pins 6 are distributed over the periphery of the housing, are accommodated in holders 7, and, by means of adjusting nuts 8 screwed onto their free end, can be adjusted from the outside in the radial direction relative to the screw 5. The holders 7 are inserted in apertures of the cooling jacket 4, and are sealed off from the cooling fluid by means of appropriate seals (not shown). Extruders having such pin cylinders are generally known, and require no further explanation for purposes of the present invention.

As shown in the detailed view of FIG. 2, each pin 6, for receiving electrically or optically conductive inserts 9, is provided with a central blind hole 16 which is introduced from the threaded end of the pin 6 and is guided over nearly the entire length of the pin up to the region of the inner end which faces the screw 5. In the embodiment illustrated, the inserts 9, which practically completely fill the blind hole 16, comprise an electrical conductor 10 which is embedded in a glass composition 19 and passes through in the form of a two-wire loop. The conductor 10 is formed, for example, from a carbon filament, or is produced from graphite, a compound material of particles obtained by sintering, or a similarly brittle material. The conductor 10 ends in two external terminals 11 with the aid of which it can be electrically integrated into a monitoring circuit 12. As shown in the embodiment illustrated in FIG. 1, the monitoring circuit 12 includes a source of direct current 14 to which, via an indicator and regulator 17, the pins 6 of a respective extrusion section are connected in series.

As long as the conductors 10 in the inserts 9 of all of the pins 6 are intact, the circuit is undisturbed and no indication is given. However, if one of the pins breaks or is extensively deformed, the current-flow resistance of the pertaining conductor 10 also changes—in extreme cases to infinity, so that the instrument 17 triggers a signal, and at the same time the non-illustrated drive motor of the extruder is switched off (arrow 20) by means of an amplifier relay 18. The damaged pin can then be immediately replaced, before serious secondary or consequential damages result.

The present invention is, of course, in no way restricted to the specific disclosure of the specification and drawing, but also encompasses any modifications within the scope of the appended claims.

What I claim is:

1. In an extruder for kneading and extruding rubber and synthetic material mixtures; said extruder having an entry region; a cylindrical housing, which includes a housing wall and a housing interior; a screw, which is rotatably mounted in said housing and is provided with recesses; the improvement in combination therewith which comprises:
    pin bodies inserted in said wall of said housing and said pin bodies having at least a first end portion which projects freely into said interior of said housing between said recesses of said screws;
    an electrical monitoring circuit arranged externally of said housing; and
    a respective insert provided at least for those pin bodies associated with the entry region of said extruder, said inserts being incorporated into said monitoring circuit, being insulated relative to said pin bodies, and said inserts comprising a conductor material of which the electrical resistance varies as a consequence of deformations thereof.

2. An extruder in combination according to claim 1, in which said inserts extend from a second end portion of an associated pin body, which second end portion is remote from said interior of said housing, to said first end portion of said pin body, which first end portion projects into said interior of said housing.

3. An extruder in combination according to claim 2, in which those pin bodies which are provided with an insert are provided with a central blind hole which is open toward said second end portion of said pin body, each blind hole serving for accommodation of one of said inserts.

4. An extruder in combination according to claim 3, in which each of said inserts includes an electrical conductor which passes therethrough in the form of a two-wire loop.

5. An extruder in combination according to claim 4, in which said electrical conductor comprises a material which is considerably more brittle than metal; and in which said inserts comprise an electrically insulating mass in which the associated electrical conductor is embedded.

6. An extruder in combination according to claim 5, in which said material of said electrical conductor is selected from the group consisting of graphite and compound materials of particles; and in which said electrically insulating mass of said inserts is selected from the group consisting of glass, ceramic, and synthetic material.

7. In an extruder for kneading and extruding rubber and synthetic material mixtures; said extruder having an entry region; a cylindrical housing, which includes a housing wall and a housing interior; a screw, which is rotatably mounted in said housing and is provided with recesses; the improvement in combination therewith which comprises:
    pin bodies inserted in said wall of said housing and said pin bodies having at least a first end portion which projects freely into said interior of said housing between said recesses of said screw;
    a monitoring system arranged externally of said housing; and
    a respective insert provided at least for those pin bodies associated with the entry region of said extruder, said inserts being incorporated into said monitoring system, and said inserts containing photo conductive filaments of which the conductivity varies as a consequence of deformations thereof.

8. An extruder in combination according to claim 7, in which said inserts extend from a second end portion of an associated pin body, which second end portion is remote from said interior of said housing, to said first end portion of said pin body, which first end portion projects into said interior of said housing.

9. An extruder in combination according to claim 8, in which those pin bodies which are provided with an insert are provided with a central blind hole which is open toward said second end portion of said pin body, each blind hole serving for accommodation of one of said inserts.

10. An extruder in combination according to claim 9, in which each of said inserts includes an optical conductor which passes therethrough in the form of a two-wire loop.

* * * * *